Figure 1:
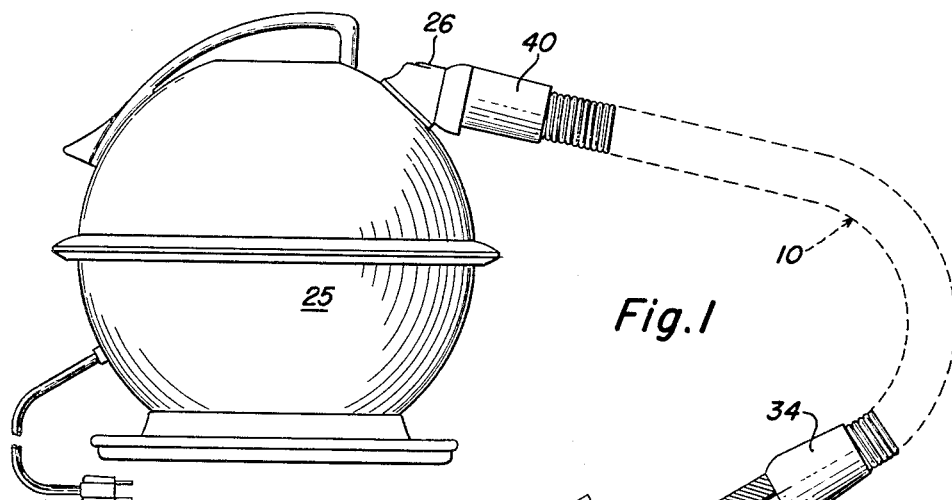

Aug. 29, 1961 M. C. PAVLIC 2,998,474
ELECTRICALLY CONDUCTIVE EXTENSIBLE HOSE
Filed Sept. 29, 1958 2 Sheets-Sheet 1

Aug. 29, 1961   M. C. PAVLIC   2,998,474
ELECTRICALLY CONDUCTIVE EXTENSIBLE HOSE
Filed Sept. 29, 1958   2 Sheets-Sheet 2

United States Patent Office 2,998,474
Patented Aug. 29, 1961

2,998,474
ELECTRICALLY CONDUCTIVE
EXTENSIBLE HOSE
Mary C. Pavlic, North Canton, Ohio, assignor to The
Hoover Company, North Canton, Ohio, a corporation
of Ohio
Filed Sept. 29, 1958, Ser. No. 764,025
2 Claims. (Cl. 174—47)

The present invention relates to an electrically conductive flexible and extensible hose of the type having a cylindrically coiled reinforcing element positioned within a thin walled tube of elastomeric thermoplastic material in which the tube is formed with an inwardly facing spiral fold in which the turns of the reinforcing coil are positioned and with an outwardly facing spiral fold positioned between the turns of the coil in which the layers of the outwardly facing fold extend inwardly considerably beyond the turns of the reinforcing coil to form loose loops of material which merely unfold when the hose is extended without stretching the material of the tube wall at all. Such hoses are usually constructed to be extended from two to four times their original static length.

With such a hose it is very difficult to assemble an electrical conductor in the hose wall without impairing the extensibility of the hose.

It has been the usual practice in the past to form the reinforcing element of such extensible hose of a coiled spring steel wire encased in a sheath of soft elastomeric thermoplastic material the same as the material which forms the corrugated tube wall. With such a construction it is a simple matter to use the spring wire as a conductor, since the turns of the coil expand and contract as the hose is extended and contracted. However, the difficulty has been to get a second conductor incorporated into the hose wall without adversely affecting the extensibility of the hose.

According to the present invention both wires of an electric circuit may be incorporated into the wall of a hose of the above described type without adversely affecting the lengthwise extensibility of the hose.

According to the present invention the reinforcing element of a hose of the above described type is formed of a spring steel wire encased within a rigid elastomeric thermoplastic sheath. With such a construction the wire may be made of smaller diameter than in previous constructions because the sheath is rigid and springy or elastic and will add its reinforcing effect to that of the wire. With such a construction the wire can be made one of the conductors of an electric circuit and a very small copper magnet wire may be encased in the rigid sheath of the reinforcing coil to form the other conductor of the circuit. Thus the small magnet wire also follows the convolutions of the reinforcing coil and is extended as the coil is extended and does not interfere with the extensibility of the hose.

According to the present invention the small diameter copper magnet wire doesn't need to have any special insulation other than the thin enamel or other coating usually provided and it can lay along side the steel wire without any other precaution. That is because the rigid elastomeric thermoplastic sheath will positively hold the magnet wire against movement relative to the steel wire and there will be no tendency for the thin insulation to be abraded from the magnet wire as the hose is flexed or extended. With previous constructions, where a soft sheath is provided for the reinforcing coil, it was found to be impossible to incorporate a small magnet wire in the sheath of the reinforcing element because the wire would kink and break through the sheath or the insulation would be worn off by relative movement between the magnet wire and the steel wire.

Also, by the use of a small copper magnet wire as the second conductor, the thickness of the sheath for the reinforcing coil need be made only slightly larger and the total cross sectional diameter of the reinforcing element may remain substantially the same as in prior hoses so that the same machinery may be used in its manufacture.

It is within the purview of the present invention that a high strength aluminum wire be substituted for the steel wire. Since a rigid sheath for the wire also forms some of the reinforcing effect, the wire need not be made of as large a diameter as would otherwise be the case.

The hose of the present invention is particularly adapted for use with a suction cleaner of the canister type wherein the extensibility of the hose has particular utility and the conductors may be used to control the motor of the cleaner either directly with the usual 110 volt circuit or where a transformer is used to place a low voltage circuit in the conductors leading to a control switch at the end of the hose.

The hose of the present invention may be made in the same manner as used in making previous hoses of the extensible type with the single exception that the rigid sheath is extruded about the steel wire and the magnet wire while the two wires are lying in contact with each other.

According to the present invention the tube may be made of polyvinyl chloride with sufficient plasticizer to render it soft such as having a durometer reading of 62±3 Shore A and the sheath for the reinforcing element may be made of polyvinyl chloride with little or no plasticizer to render it comparatively rigid with a durometer reading of 78 Shore B.

Other suitable elastomeric thermoplastic materials may be used for the reinforcing element sheath so long as the sheath in its finished form is sufficiently rigid to hold the magnet wire against movement relative to the steel wire and is elastic so that the hose may be easily extended lengthwise and when released will return to its contracted length.

Figure 2:
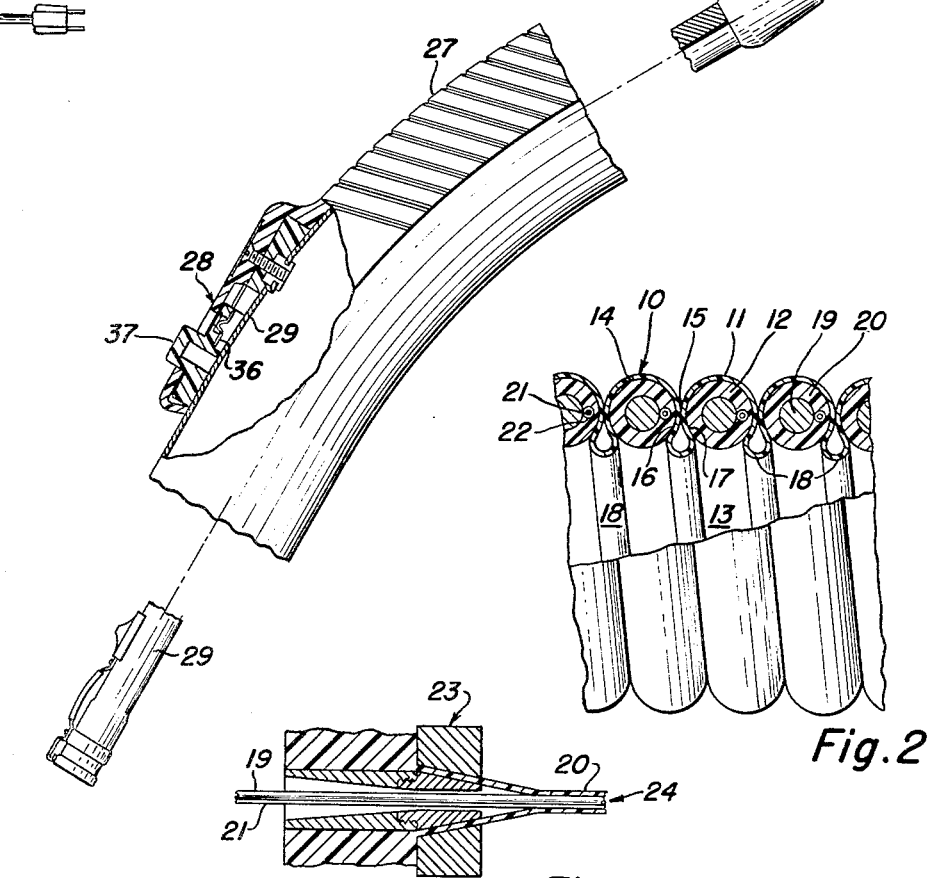
Figure 3:
Figure 5:
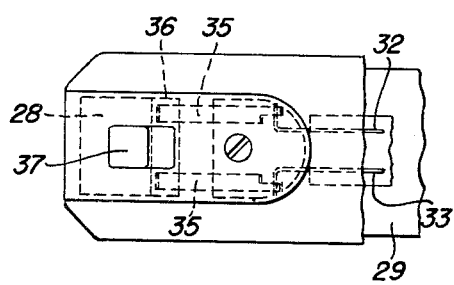
Figure 6:
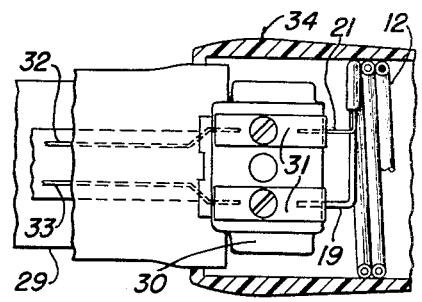
Figure 4:
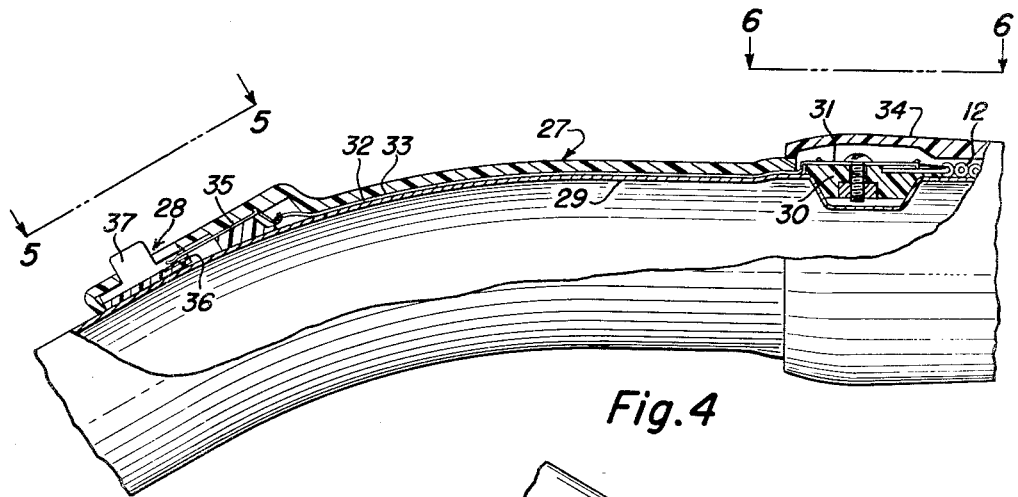
Figure 8:
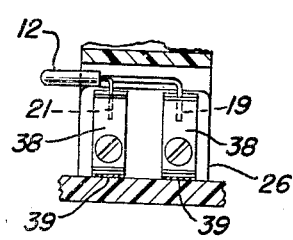
Figure 7:
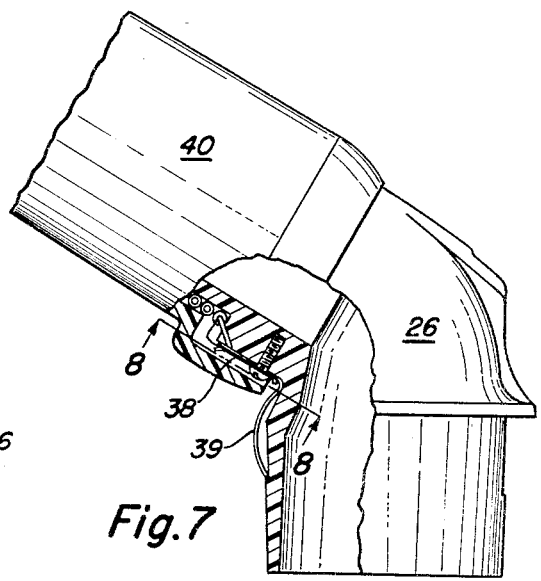

Other objects and advantages of the present invention will become apparent as the description proceeds when taken in connection with the accompanying drawings in which:

FIG. 1 is a view of a suction cleaner with the hose of the present invention applied thereto, FIG. 2 shows a short section of the hose of the present invention partly in section to show the construction of the reinforcing element, FIG. 3 is a cross sectional view of an extruder head showing the rigid sheath being extruded about the reinforcing element, FIG. 4 is a view, partly in section, showing how the conductors are connected to the hand grip and switch at the end of the hose, FIG. 5 is a sectional view taken on line 5—5 of FIG. 4, FIG. 6 is a sectional view taken on line 6—6 of FIG. 4, FIG. 7 is a view partly in section showing how the conductors are connected to the fitting which connects the hose to the suction inlet of the cleaner of FIG. 1 and FIG. 8 is a detailed view of the connection of FIG. 7.

The hose of the present invention is generally indicated by the reference numeral 10 and its construction is shown in detail in FIG. 2. It comprises a soft elastomeric thermoplastic tube 11 and a cylindrically coiled reinforcing coil generally indicated by the reference numeral 12.

As shown in FIG. 2 the hose 10 is in its normal static contracted condition in which the individual turns 13 of the coil 12 are as close together as permitted by the walls of the tube 11.

The tube 11 is formed with two spiral folds or corrugations which extend the entire length thereof. The individual turns 13 of the coil 12 are positioned within the inwardly facing fold 14. The walls forming the outwardly facing fold 15 extend inwardly between and separate the turns 13 as shown at 16 and 17 and terminate in a closed loop 18 of slack material which merely unfolds without stretching when the turns 13 are separated from each other to give the hose its longitudinal extensibility.

The coil 12 comprises an inner steel spring wire 19, a sheath 20 of a rigid elastomeric thermoplastic material and a small copper magnet wire 21 having the usual enamel or other coating 22.

The magnet wire 21 may be number 32 copper wire about 8 mils in diameter and the insulation 22 may be enamel or any other thin flexible coating usually applied to magnet wire.

The sheath 20 may be made of polyvinyl chloride having little or no added plasticizer with a durometer reading of 78 Shore D. Any other elastomeric thermoplastic material having the proper rigidity, capable of being coiled into a cylindrical coil and having the characteristics that the coil turns may be separated and thereafter return to their collapsed position, may be used. The sheath 20 should be at least 0.018 inch in thickness so that the magnet wire 21 is completely embedded therein.

The wire 19 may be a steel wire 0.058 or less inches in diameter and having a tensile strength of 275,000 pounds per square inch. The steel wire may be replaced by an aluminum wire of suitable rigidity, elasticity and strength.

For use with suction cleaners it has been found that the coil turns 13 may be 1⅜ inches in diameter and the tube 11 having an original diameter considerably smaller. The tube 11 is preferably made of a soft polyvinyl chloride having a durometer reading of 62±3 Shore A having a tensile strength of 2,000 pounds per square inch at 80° F.

In making the hose of the present invention a polyvinyl chloride mixture of the proper composition is first extruded over and about the wires 19 and 21 by an extruder such as shown in FIG. 3 and generally represented by the reference numeral 23. It is to be noted that the wires 19 and 21 are in contact with each other as the sheath 20 is extruded thereover. If found necessary or desirable, suitable guides may be formed in the die for holding the wires in the proper relationship as the sheath 20 is extruded thereover to form the composite rod 24 shown emerging from the extruder 23 in FIG. 3. Such guides would be primarily for the purpose of assuring that the magnet wire 21 is always positioned on the same side of the steel wire 19 as the sheath 20 is extruded thereover.

The composite rod 24 may be stored on reels in suitable lengths for later use or it may be led directly to a wire coiling machine such as that disclosed in the United States patent to Duff, 2,793,672, dated May 28, 1957. It has been found that the composite rod 24 may be coiled into the cylindrical coil 12 by the machine of the Duff patent in such a manner that the individual turns 13 will press against each other in their normal static condition. The turns 13 may be separated from each other by stretching the coil 12 lengthwise but will resume their normal static condition with the turns in contact with each other when the stretching force is released.

In winding the coil 12 care should be taken that the centers of the two wires are on the same diameter. It has been found that if the composite rod 24 is properly started into the winding machine the row will tend to stay in that position because otherwise there would be a tendency to stretch one wire or the other.

The hose 10 may then be formed from the coil 12 in any of the methods known in the art, one of which is disclosed in the United States patent to Martin, 2,797,730, dated July 2, 1957.

The finished hose is extensible lengthwise to from 2 to 4 times its static contracted length depending upon the amount of stretch given to the coil 12 when the tube was applied. It is to be noted that the conducting wire 21 does not interfere with the extensibility of the hose because it follows the turns 13 of coil 12 and is of small diameter. The fact that the sheath 20 is rigid and holds the wire 21 against movement relative to the wire 19 assures that the enamel or other insulation 22 will not be rubbed off.

It is also to be noted that the centers of the wires are on the same diameter. That is the desirable relationship and if care is exercised in the extrusion and coiling operations that condition can be at least approximated. With the wires on the same diameter there is no tendency to stretch the magnet wire when the hose is flexed or extended.

The hose of the present invention is particularly adapted for use with a canister type suction cleaner. It has the requisite extensibility for cleaning a large area about the cleaner and the cleaner may be controlled from the end of the hose without walking over to the cleaner each time it is desired to turn the cleaner off or on.

As shown in FIG. 1 the hose 10 is shown connected to the suction inlet of a canister cleaner 25 by means of a fitting 26. At its free end the hose is provided with a hand piece 27 provided with a switch 28. The conductors 19 and 21 of hose 10 may be connected directly to the leads of the motor of the cleaner, in which case the conductors would carry 110 volts which is well within their capabilities or a transformer may be provided to reduce the voltage in the conductors in order to avoid a shock hazard. The latter is the best procedure since there will also be less danger of a short circuit between the wires 19 and 21 within the hose wall.

FIGS. 4, 5 and 6 show how the conductors 19 and 21 are connected to the switch 28. The hand piece 27 is applied to a metallic sleeve 29 which at one end is attached to the free end of the hose 10 in any suitable manner and its other end is extended for attachment to any suitable cleaning tool.

An insulating block 30 is suitably attached to the inner end of sleeve 29 and a pair of conductive strips 31 are secured to the block 30 by screws as shown. The ends of conductors 19 and 21 are bent forwardly as shown in FIG. 6 and soldered to the strips 31.

A pair of conductors 32 and 33 are positioned in grooves in the lower surface of hand piece 27 and at one end are also soldered to the strips 31. The covering sleeve 34 may then be applied to cover the joint. At their other ends the conductors 32 and 33 are soldered to a pair of conducting strips 35 the free ends of which form the contacts of switch 28. The strips are adapted to be bridged by a bridging strip 36 carried on the upper face of the slider 37. When the slider 37 is pushed forwardly the bridge strip 36 will bridge the ends of strips 35 and the circuit will be closed. When the slider 37 is moved rearwardly the ends of strip 36 will rest on the insulating upper surface of slider 37 and the circuit will be open.

FIGS. 7 and 8 show how the conductors 19 and 21 are connected into the motor or transformer circuit. The ends of conductors 19 and 21 are soldered to a pair of conducting strips 38 which are secured to the fitting 26 by screws as shown. The strips 38 are extended downwardly along the side of fitting 26 in the form of spring loops 39. These loops in turn make contact with contacts in the suction opening of the cleaner when the fitting 26 is inserted into the suction opening. The contacts in the suction opening may be connected directly to the motor leads but are preferably connected to the low voltage circuit of a transformer system.

The protecting sleeve 40 may be applied after the electrical connections are made.

From the foregoing it can be seen that the present invention provides an extensible, flexible, electrically conductive suction cleaner hose in which the electrical conductors are so associated with the hose wall that their presence does not affect the extensibility or flexibility of the hose in any way whatsoever.

While I have shown and described but a single embodiment of my invention, it is to be understood that that embodiment is to be taken as illustrative only and not in a limiting sense. I do not wish to be limited to the specific structure shown and described but wish to include all equivalent variations thereof except as limited by the scope of the claims.

I claim:

1. An extensible electrically conductive flexible hose of the type having a cylindrically coiled reinforcing coil in which the turns of said coil are stressed to move toward each other when free to do so and a thin covering tube of a soft elastomeric thermoplastic material which is provided with an inwardly facing spiral fold extending the full length thereof in which the turns of said coil are positioned and with an outwardly facing spiral fold extending the full length thereof and lying between the turns of said coil in which the walls of said tube which form said outwardly facing spiral fold extend inwardly beyond the turns of said coil to form loose loops of wall material which merely unfold without stretching when the hose is extended lengthwise; said reinforcing coil comprising an inner high strength metallic wire, a copper magnet wire of smaller diameter than that of said high strength wire having a thin coating of insulation lying in contact with said high strength wire along the length of said coil and a rigid elastic sheath of an elastomeric thermoplastic material comparatively more rigid than the material of said tube embedding said wires and holding them against movement relative to each other.

2. An electrically conductive flexible hose of the type having a cylindrically coiled reinforcing coil in which the turns of said coil are spaced apart and a thin covering tube of a soft elastomeric thermoplastic material which is provided with an inwardly facing spiral fold extending the full length thereof in which the turns of said coil are positioned and with an outwardly facing spiral fold extending the full length thereof and lying between the turns of said coil with the walls which form said outwardly facing spiral fold extending inwardly between the turns of said coil; said reinforcing coil comprising a high strength metallic wire, a copper magnet wire of smaller diameter than that of said high strength wire having a thin coating of insulation lying in contact with said high strength wire along the length of said coil and a rigid elastic sheath of an elastomeric thermoplastic material harder than said tube embedding said wires and holding them against movement relative to each other.

References Cited in the file of this patent

UNITED STATES PATENTS

| | | |
|---|---|---|
| 2,072,690 | Smellie | Mar. 2, 1937 |
| 2,320,367 | Leathers | June 1, 1943 |
| 2,516,864 | Gilmore et al. | Aug. 1, 1950 |
| 2,739,616 | Duff | Mar. 27, 1956 |
| 2,890,264 | Duff | June 9, 1959 |